Dec. 10, 1968  E. F. WEBSTER  3,415,700
METHOD OF MAKING CONVEYOR BELT
Filed Feb. 18, 1963

INVENTOR.
EARLE F. WEBSTER
BY
ATTORNEY.

3,415,700
METHOD OF MAKING CONVEYOR BELT
Earle F. Webster, Riverton, N.J., assignor to H. K. Porter Company, Inc., Pittsburgh, Pa., a corporation of Delaware
Filed Feb. 18, 1963, Ser. No. 259,459
3 Claims. (Cl. 156—164)

ABSTRACT OF THE DISCLOSURE

The invention comprehends the production of conveyor belting material by subjecting synthetic fiber fabric such as heavy woven nylon cloth to severe longitudinal stress while heating the fabric to elevated stress-relieving temperature, maintaining it under stress while cooling and then incorporating it in a conveyor belt by application of elastomeric material, to the fabric surfaces and heatcuring it, plies of fabric made of other than synthetic fibers usually being incorporated in the belt together with the stressed and heat-set synthetic fiber fabric ply or plies.

---

Conveyor belts usually are made by combining through vulcanization a number of plies of heavy rubber coated cotton fabric and rubber covers united at the belt edges to protect the fabric plies from moisture and other deteriorating agents, but apart from the excessive weight per unit length of such belts they are relatively limited in service life and unduly susceptible to localized injury from impact of falling objects; efforts to improve these characteristics, however, by utilizing fabrics made from synthetic nylon fiber yarn have been unsuccessful largely because of the excessive longitudinal stretchability of the resulting belt.

An object of the invention is the provision of a method of making a conveyor belt whereby through preliminary treatment of fabric used therein the ultimate stretch characteristics of the finished belt may be controlled and largely predetermined.

Other objects, purposes and advantages of the invention will hereinafter more fully appear or be understood from the following description of a preferred embodiment of the belt it embraces as well as the method of its manufacture, reference being had to the accompanying drawing in which.

Figure 1:
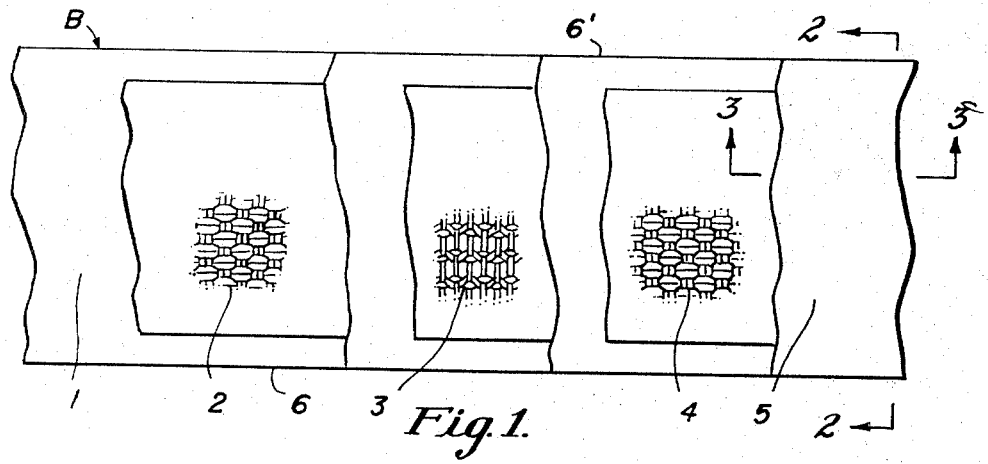
FIG. 1 is a fragmentary top plan view of the belt broken away in stages to disclose internal construction.
Figure 2:
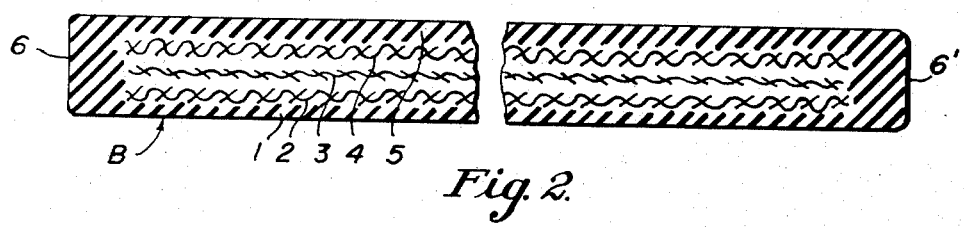
FIG. 2 is an enlarged fragmentary transverse section on line 2—2 in FIG. 1 with the distance between the fabric plies exaggerated for convenience of illustration.
Figure 3:
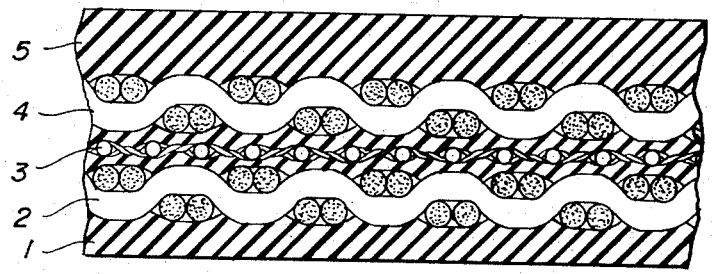
FIG. 3 is a further greatly enlarged fragmentary longitudinal section on line 3—3 in FIG. 1.

Referring now more specifically to the belt illustrated and to the method of its manufacture it will be understood that whereas efforts have been made to utilize other synthetic fiber yarn fabrics in conveyor belts, particularly fabrics made from yarns of a polyester terephthalate such as "Dacron" marketed by E. I. du Pont de Nemours Company, Wilmington, Del., adequate adhesion between these fabrics and the elastomeric composition applied to their surfaces cannot be attained readily if at all.

In accordance with my invention, however, plies of a fabric made from synthetic fibers of a character to which the elastomeric composition to be used with it can readily and permanently bond during manufacture of the belt are combined with an inner layer of rubberized cotton fabric but before incorporating the synthetic fiber fabric into the belt I subject it to special conditioning effective to reduce greatly its yieldability under longitudinal stress.

The synthetic fiber fabric may be one made from continuous filament nylon yarns having filler yarns of weight not materially less than that of the warp yarns and in which, as it issues from the loom on which it is woven, the warp yarns contain a pronounced crimp or sinuosity longitudinally of the fabric, the effective length of the warp yarns being thus substantially reduced as compared with their length prior to weaving. In carrying out the aforesaid conditioning I subject this fabric to severe longitudinal stress in the direction of its warp yarns while heating it to a stress relieving temperature with the result that the fabric per unit of length is substantially extended and any tendency of the warp yarns to reassume their formerly deeply crimped contour largely eliminated, their crimp being reduced from the usual approximately 10%–15% to little if any more than 3.5%–5.0% calculated in accordance with the formula:

$$C = \frac{Lw - Lf}{Lf} \times 100$$

where C represents the percent crimp, $Lw$ the original unit length of warp yarn prior to weaving and $Lf$ the length of fabric produced from 1 $Lw$ expressed in the same linear units. This result can readily be attained by passing the strip through a 400° F. oven several times under tension progressively increased from pass to pass. Further stress relieving the strip results from cooling it while continuously subjected to the aforesaid tension.

More particularly the fabric is preferably a 33.75 oz./sq. yd. 2 x 2 weave one of four 1680 denier ply low (2¼ S) twist nylon warp yarns and three 1680 denier ply low (2¾ S) twist nylon filler yarns, and is initially about 0.070" thick; after the elongation and stress relieving treatment its thickness is about 0.055". It is then sized with a resorcinal-formaldehyde-latex (R.F.L.) emulsion in water, dried and coated on both sides, usually by "skimming," with a suitable elastomeric composition capable of bonding with the sized nylon fabric on vulcanization.

In addition to the aforesaid treated fabric I utilize for the inner ply of the belt a 9 oz. leno weave cotton fabric comprising about 8 pairs of warp yarns and about 12 filler yarns per inch coated on both sides, usually by "frictioning," with an elastomeric composition capable of bonding with cotton and with the coating of the nylon fabric.

Thus in the production of belt B which as shown in the drawing comprises three fabric plies although a different number may be used, I apply to a strip 1 of uncured elastomer about .06" thick a layer 2 of the stretched, stress relieved and coated nylon fabric above described, then a layer 3 of the coated cotton fabric, next a second layer 4 of the nylon fabric and finally a second strip 5 of the same elastomeric material as comprised in strip 1 but usually somewhat thicker, up to possibly .375" with the longitudinal edges of the strips projecting laterally a little beyond the aligned edges of the three fabric layers and into engagement with each other to produce after vulcanization edges 6, 6' on the belt as a whole.

The assembly is then introduced progressively to a vulcanizing press and heated under tension in the customary way to consolidate its several components and cure the elastomeric material, a temperature of about 300° F. for some 30–40 minutes normally being employed in the press platens which are preferably cooled before the tension on the belt is relieved and the press re-opened. The fully cured belt is now ready for service and splicing of the ends when an endless belt is required can be accomplished in any of the convenient ways well known in the art.

To demonstrate more clearly the effect on the nylon fabric of the preliminary conditioning treatment herein described, as an example the fabric on delivery from the loom may contain about 12.5% crimp in its warp yarns; after the stretching and stress-relieving treatment this crimp may be reduced to about 3.5%, the warp yarns thereby becoming less sinuous in the direction of their length than prior to treatment, and the fabric extended from about 8.5 filler picks per inch to 7.75 picks, an elongation of close to 9%. This reduction in sinuosity and hence in degree of crimp in the warp yarns substantially diminishes the stretchability of the fabric longitudinally while noticeably compacting it transversely and imparting relatively smooth outer surfaces to it which properties are retained when the fabric is incorporated in a belt in the manner described with its warp yarns running longitudinally thereof.

The aforesaid sizing operation includes saturating the fabric with a material such as that designated "No. 230 Capitol 100% clear" produced by Textile Proofers, Inc., Jersey City, N.J., followed by heating with steam at 15# pressure to evaporate the water vehicle and render the nylon fibers of the fabric receptive to bonding with the elastomeric compound subsequently applied to it.

While I have herein specifically stated I prefer to use nylon fabric for the principal strain bearing plies of my belt, and to employ between adjacent pairs thereof a leno weave cotton fabric as an intermediate ply, the principal function of which is to promote bonding the nylon plies together, the invention contemplates utilizing other heat shrinkable synthetic fibers in place of nylon and fabrics other than the cotton one described for the intermediate ply, and it is a feature of the invention that the synthetic fiber fabric is preliminary treated as herein described to substantially reduce the normal crimp in its warp yarns whereby the inherent stretchability of the finished belt is controlled and materially lessened as compared with a belt similarly made but with the said treatment omitted. My improved belts are moreover appreciably more resistant to damage from impact of heavy and sharp edged bodies than are those made from like fabrics in which the normal crimp produced by weaving is retained although the precise scientific reason for this difference has not thus far been ascertained.

It will further be appreciated that the latex in the R.F.L. suspension used for sizing the synthetic fiber fabric plies should be compatible with and susceptible of bonding to the specific elastomeric compound to be used with it; hence when neoprene is to be used in the belt neoprene latex should be employed in the R.F.L. suspension.

Having thus described my invention, I claim and desire to protect by Letters Patent of the United States:

1. The method of making a belt which comprises mechanically elongating woven synthetic fiber fabric in the direction of its warp yarns to thereby eliminate a substantial proportion of the sinuosity imposed on said yarns during weaving, while the fabric is so elongated subjecting it to stress-relieving heat treatment, providing the fabric with an elastomeric coating, and then simultaneously by vulcanization bonding two plies of the coated synthetic fiber fabric to opposite faces of an elastomer coated naturel fiber fabric ply while bonding elastomeric covering strips to the outer surfaces of the coated synthetic fiber fabric plies.

2. The method defined in claim 1 in which the step of elongating the synthetic fiber fabric includes passing it repeatedly through a heated space while under tension in the direction of its warp yarns.

3. The method defined in claim 1 in which the crimp in the warp yarns of said synthetic fiber fabric is less than about 10% and greater than 0.5% calculated in accordance with the formula $$C = \frac{Lw - Lf}{Lf} \times 100$$

where C represents the percent crimp, $Lw$ one unit length of warp yarn before weaving and $Lf$ the length of woven fabric prior to said elongation produced from one $Lw$.

References Cited

UNITED STATES PATENTS

| 2,956,331 | 10/1960 | Whitehead | 161—92 |
| 2,984,594 | 5/1961 | Runton | 198—193 |
| 3,247,038 | 4/1966 | Kraft | 156—229 |

FOREIGN PATENTS

| 750,356 | 6/1956 | Great Britain. |

ROBERT F. BURNETT, *Primary Examiner.*

WILLIAM J. VAN BALEN, *Assistant Examiner.*

U.S. Cl. X.R.

156—178, 229; 161—92, 96; 198—193